Feb. 21, 1956  S. V. COLLINS  2,735,270
LAUNCHING STRUCTURES AND METHODS
Filed Nov. 26, 1952  6 Sheets-Sheet 1
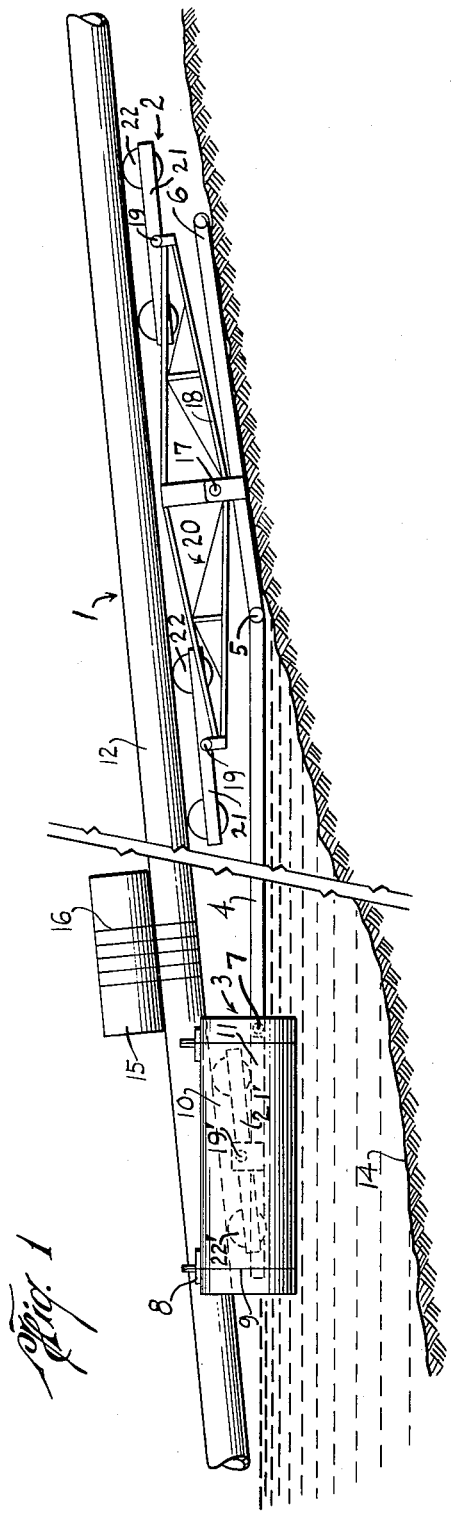
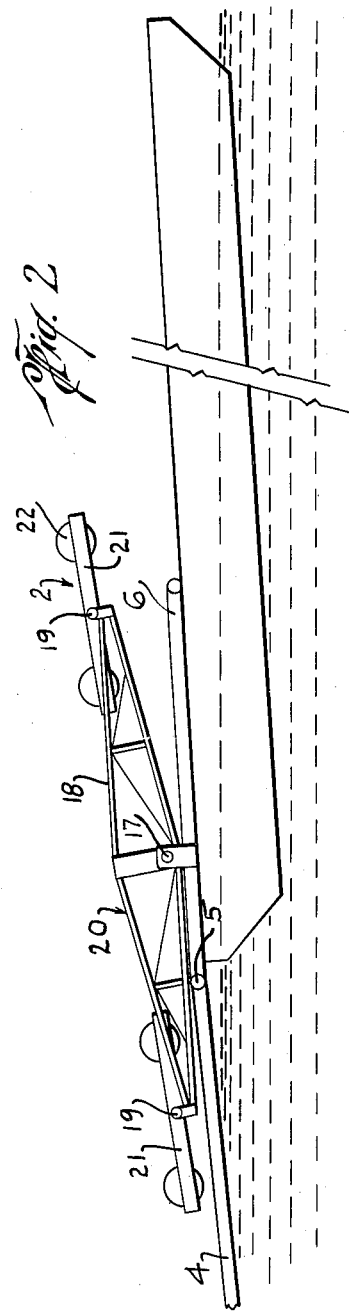
Samuel V. Collins
INVENTOR.
BY Wm. E. Ford
ATTORNEY

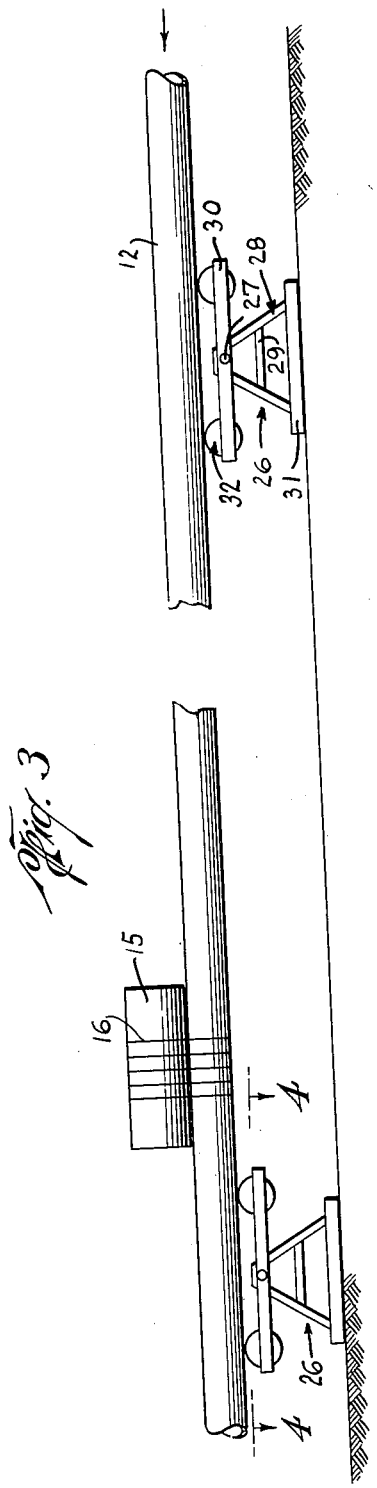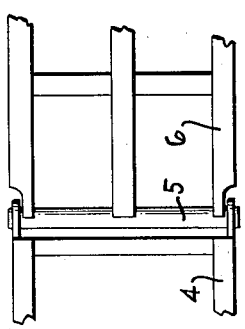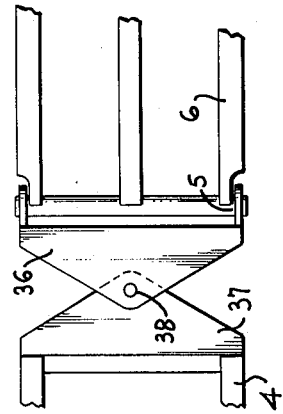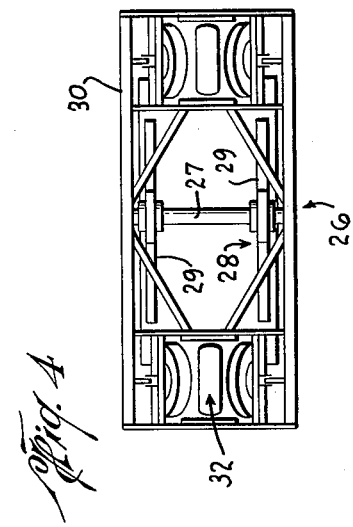

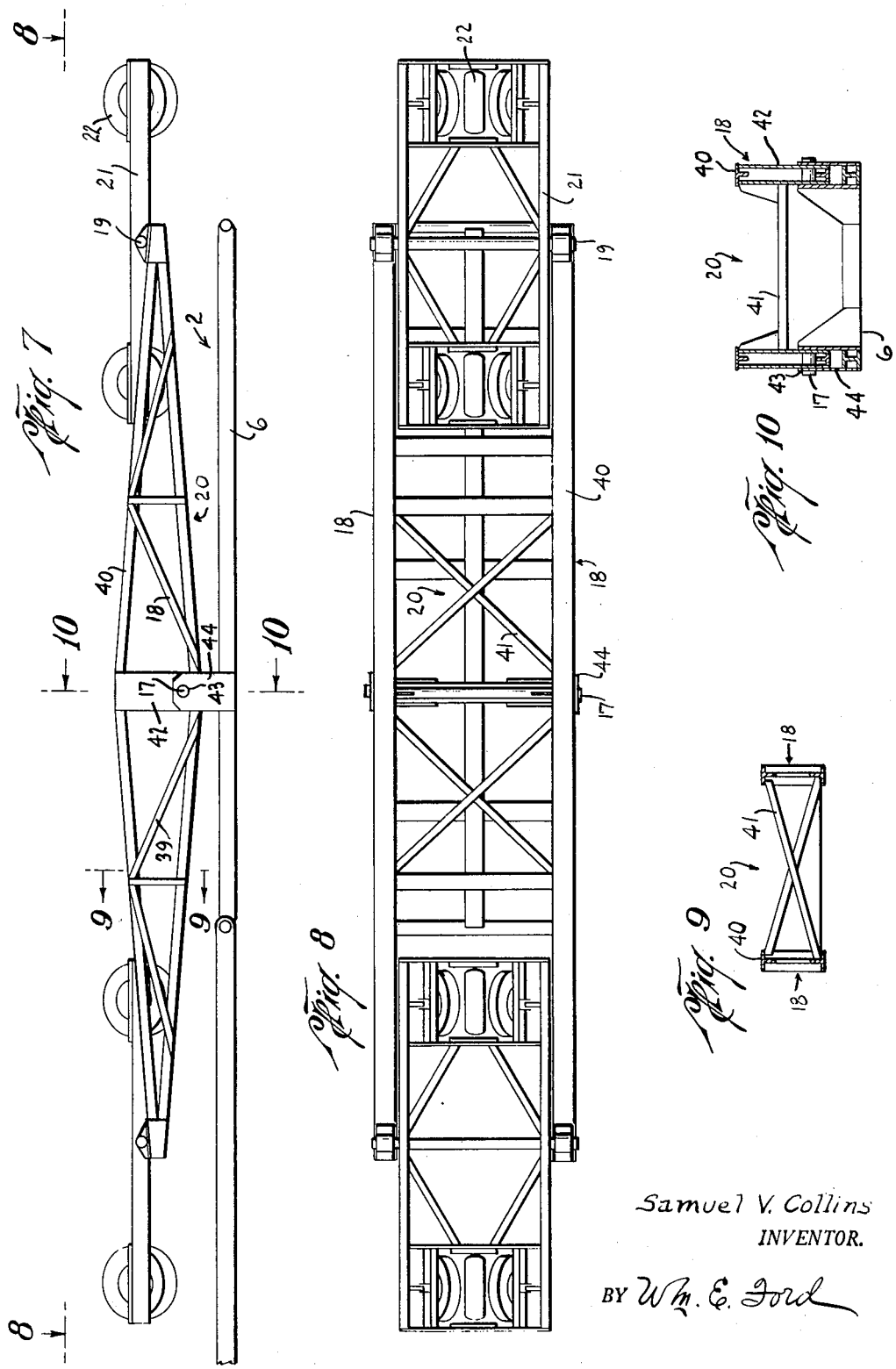

Samuel V. Collins
INVENTOR.

BY Wm. E. Ford

ATTORNEY

Feb. 21, 1956  S. V. COLLINS  2,735,270
LAUNCHING STRUCTURES AND METHODS
Filed Nov. 26, 1952  6 Sheets-Sheet 5
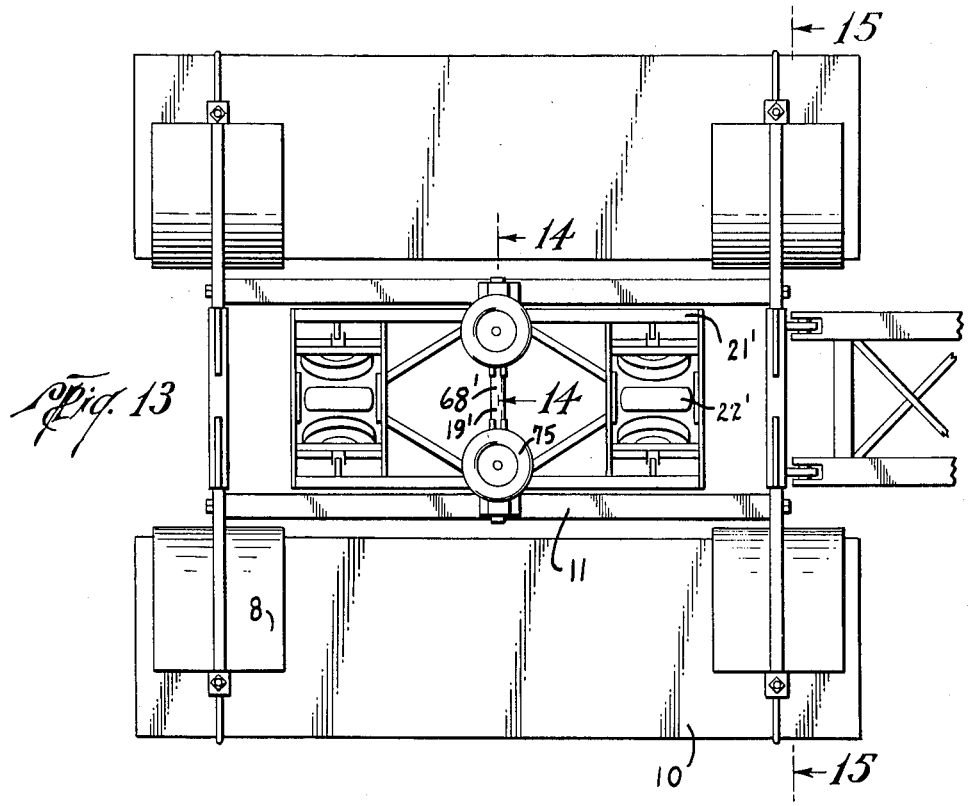
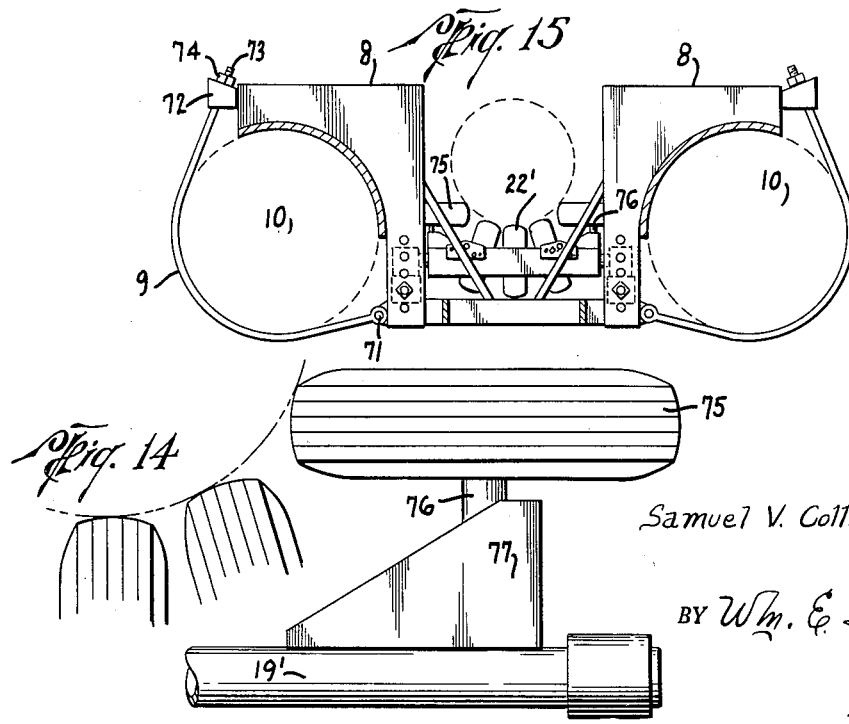
Samuel V. Collins
INVENTOR.
BY Wm. E. Ford
ATTORNEY Feb. 21, 1956    S. V. COLLINS    2,735,270
LAUNCHING STRUCTURES AND METHODS
Filed Nov. 26, 1952    6 Sheets-Sheet 6
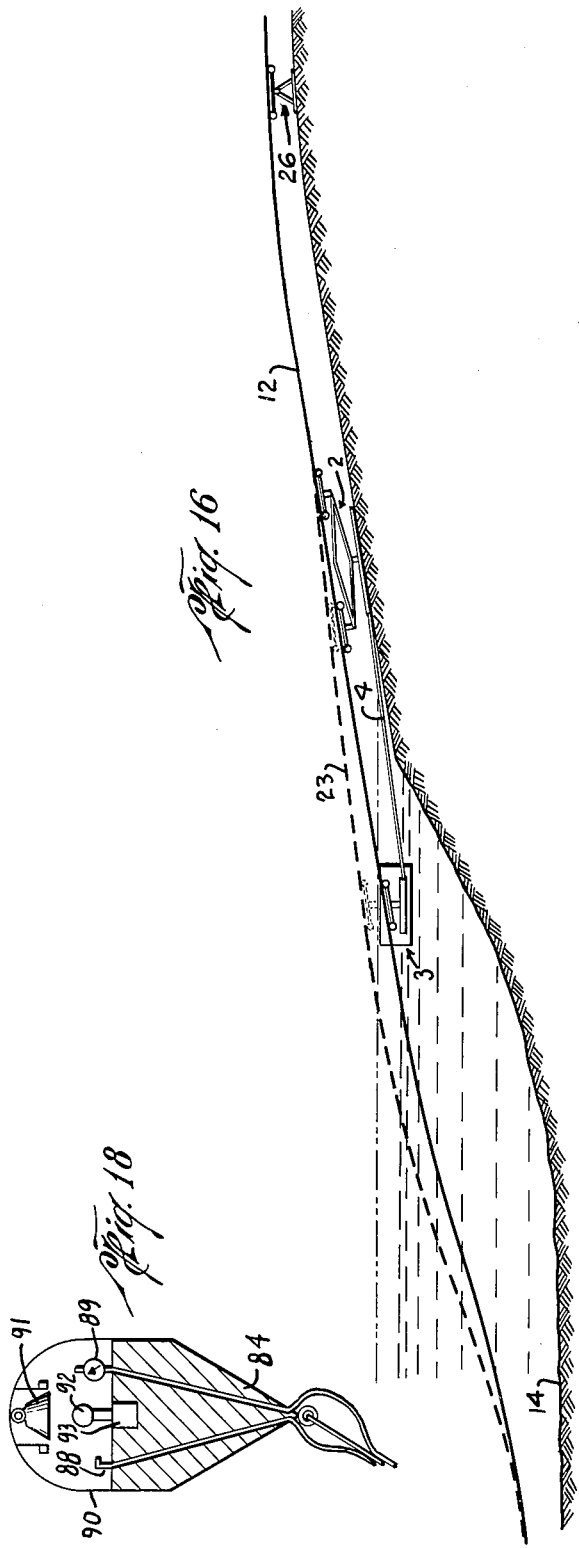
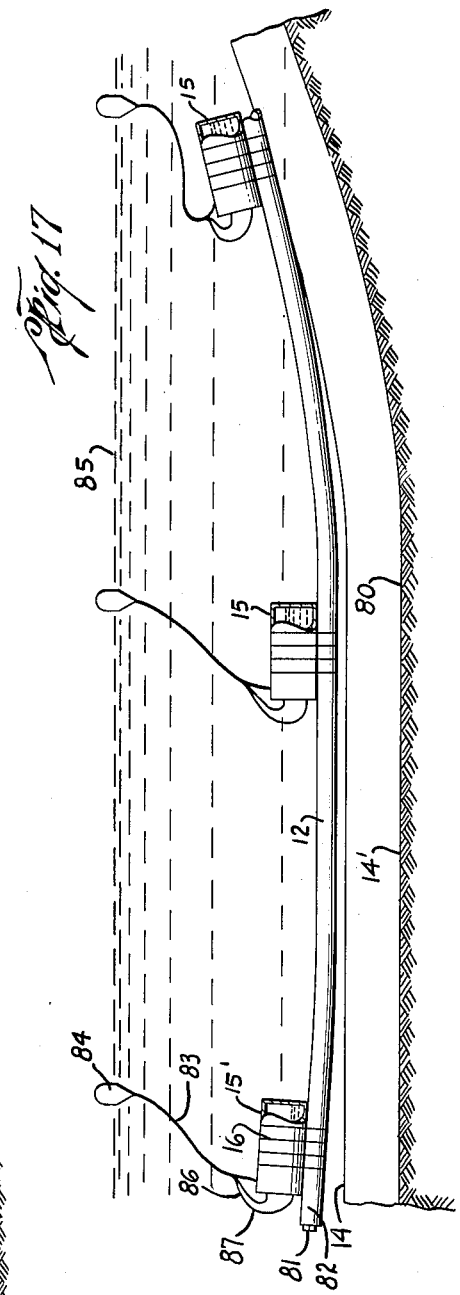
Samuel V. Collins
INVENTOR.
BY Wm. E. Ford
ATTORNEY

United States Patent Office 2,735,270
Patented Feb. 21, 1956

2,735,270

LAUNCHING STRUCTURES AND METHODS

Samuel V. Collins, Victoria, Tex.

Application November 26, 1952, Serial No. 322,720

7 Claims. (Cl. 61—72)

This invention relates to structures for, and methods of, launching a lengthy object, as a tubular structure, cable or pipe line, to extend across a body of water, and often in substantially submerged condition, whereby the object may rise and fall with the tide during the launching process, and may yield within limits to the currents, without risking injurious bending of the object.

It is therefore an object of this invention to provide launching structures and methods whereby a lengthy object, as a pipe line, may extend from land or from a marine platform into the water to rise and fall with the tides during launching, and to yield within limits to the currents, without the attendant risk of injurious bending during launching.

It is also an object of this invention to provide launching structures and methods whereby a support means on land or on a marine platform provides a frame pivot transversely of the direction of travel of the object to be launched on which pivots a frame which provides wheel means at points spaced apart on either side of such pivot, whereby the object may move in a substantial vertical plane passing substantially through its longitudinal axis.

It is yet a further object of this invention to provide launching structures and methods whereby the water-borne portions thereof are pivotally, or universally pivotally connected to the land based or marine platform supported portions, whereby the structures may yield, within limits, to the force of the currents.

It is still another object of this invention to provide launching structures and methods whereby the means supporting the object to be launched may be aligned inland from the shore and substantially transversely of the shore line at spaced apart intervals.

It is also a further object of this invention to provide launching structures and methods of this class which include wheel units or guide means each comprising a plurality of wheels so adjustable as to accommodate pipe or objects of various diameters and sizes.

It is yet another object of this invention to provide launching structures and methods of this class which include means and methods for maintaining the outer end of the pipe line slanted upwardly at it traverses a body of water.

It is an additional object of this invention to provide structures and methods for buoying an object to be entrenched under a body of water at an elevation just above the floor below the body of water during launching, while permitting the water-borne supporting means adjacent the shore to rise and fall with the tide without bending the object supported thereby.

Other and further objects will be apparent when the specification is considered in connection with the drawings in which:

Fig. 1 is an elevation of a preferred modification of a launching structure.

Fig. 2 is an elevation of a launching structure employable with a marine platform, as a barge.

Fig. 3 is an elevation of a launching structure preferably employable inland of the water's edge.

Fig. 4 is a plan view taken along line 4—4 of Fig. 3.

Fig. 5 is a plan view of a single pivot connection for joining a connecting member to a launching structure.

Fig. 6 is a plan view of a double pivot or universal connection as an alternative to the arrangement shown in Fig. 5.

Fig. 7 is an elevation of one of the launchers comprising part of a launching structure.

Fig. 8 is a plan view taken along line 8—8 of Fig. 7.

Fig. 9 is a sectional elevation taken along line 9—9 of Fig. 7.

Fig. 10 is a sectional elevation taken along line 10—10 of Fig. 7.

Fig. 13 is a plan view of the water-borne portion of a launching structure.

Fig. 14 is a fragmentary sectional elevation taken along line 14—14 of Fig. 13.

Fig. 15 is a sectional elevation taken along line 15—15 of Fig. 13.

Fig. 16 is an elevation, partially diagrammatic, showing the principle whereby the pipe line may accommodate itself to a change in the tide.

Fig. 17 is an elevation, partially diagrammatic, showing the method of floating the outer end of a launched pipe line above the floor of the body of water which it is in process of traversing.

Fig. 18 is a fragmentary sectional elevation of one of the marker buoys shown in Fig. 17.

Figure 11:
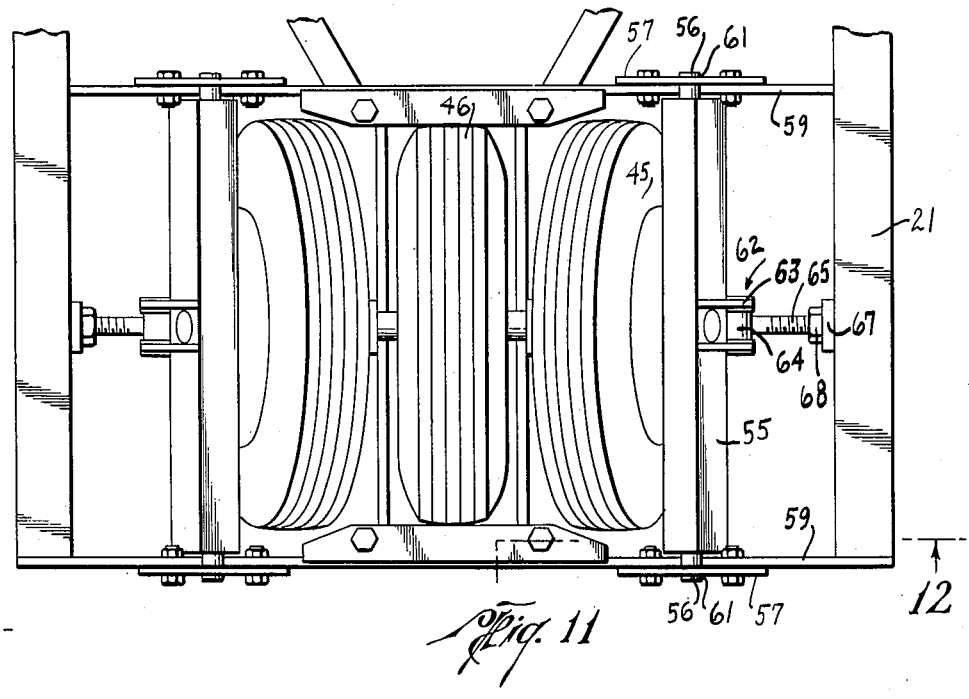
Fig. 11 is a plan view of the wheel means at one end of a launcher frame.

As shown in Fig. 1, a launching structure 1 may comprise a launcher 2 on shore and a pontoon barge 3 which is water-borne and and therefore at lower level than the launcher 2 on solid ground. Opposite ends of a tie or connection member 4 are pivoted at 5 to the base 6 of the launcher and at 7 to the water-borne portion of the launching structure or pontoon barge 3 to maintain launching alignment while accommodating relative rise and fall with change in water level.

Brackets 8 and cable 9 connect the pontoons 10 to the barge structure 11 of the pontoon barge 3. Also, in order to buoy the pipe line 12 above the level of the floor 14 below the body of water a float means as indicated by the barrel 15, is attached to the pipe line 12 by the cables 16.

The launcher 2 provides a pivot 17 upon its base 6, such pivot extending transversely of the axis of launching or the longitudinal axis of the pipe line 12. A truss or side frame 18 is pivotally mounted on the pivot 17 on each side of the launcher, and a pivot 19 is provided to extend between the ends of the trusses at either end of the launcher to connect the trusses into a truss member or walking beam assembly 20, and to provide pivots parallel to the pivot 17 and transverse of the pipe line axis. A frame or rocking beam 21 is pivotally mounted on each pivot 19, and supports for rotation a wheel means or unit 22 at each end thereof.

The barge structure 11 provides the pivot 19' on which is pivoted a frame or rocking beam 21' which in turn supports for rotation the wheel means or units 22'. The mounting pivot 19' is thus at a constant distance from the level of the water but rises and falls with the water, while the mounting pivot 17 is always at a fixed position on land unaffected by water level.

Thus it can be seen that if the tide should rise during the launching process, and since the pontoon barge 3 must of necessity tend to float on the surface of the water at the level of tide increase, the pipe line must also accommodate itself to this upward movement of its water-borne support. Also, it is apparent that such accommodation must extend landward as well as seaward or else the pipe line will tend to be borne and bowed upwardly by the tendency of the pontoon barge 3 to rise with the tide.

This accommodation is provided by virtue of the fact that the connection member 4 pivotally maintains the pontoon barge connected to the land based launcher 2; while the truss member 20 pivots on the launcher base 6; while the frames 21 thereon pivot on the truss member 20; and while the frame 21' pivots on the barge structure 11. Thus the pipe line 12, as it is supported by the wheel units 22' on the water, and 22 ashore, can take the position indicated by the dotted line 23 in Fig. 16, thereby adjusting itself to the new elevation of the pontoon barge 3, with a minimum of bending stress.

It is obvious that the same principles can be employed on a marine platform, barge, or floating raft, as indicated in Fig. 2, in which the platform floor corresponds to the shore.

Inland of the launcher 2, and in alignment therewith, a series of launchway units 26 may be provided, as shown in Fig. 3, whereby the pivoted truss of the launcher 2 is omitted, and the pivot 27 is provided by the support means 28 of the launchway unit 26. Such support means may comprise an A-frame 29 on each side of the base 31 of the support, and extending thereabove, and cross-connected at least by a shaft or trunnion 27. The frame 30 is pivotally mounted on the opposite ends of the shaft 27 and at each end the frame rotatably supports the wheel units 32, which in turn support the pipe line 12. These launchway units 26 may be provided in such numbers, and in such spaced apart relationship, as to reduce to insignificance any tendency of the pipe line 12 to bend due to the upward buoying of the pontoon barge 3.

As shown in Fig. 4, such frame may support three-wheel units 32 at either end thereof, while the frame itself has the ends of the pivot or cross-connection rod or shaft 27 journalled therein. Such wheel units 32 are adjustable to fit and support the periphery of various diameter pipe lines, and this adjustability will be described hereinbelow.

Fig. 5 shows that the base 6 of the launcher 2 (or optionally the base 31 of a launchway unit, when such may replace a launcher 2 as the shore positioned unit of a launching structure), may provide, as a pivot 5, its end structural element, such as a rod or pipe section, so that the connection member 4 may be pivotally mounted thereon.

Optionally, in cases where both tide and currents are to be considered, as shown in Fig. 6, a bracket member 36 may be pivotally connected on a transverse axis at 5 to the base 6 (or optionally to the base 31), and a bracket 37 connected to the landward end of the connection member 4. Then the two brackets 36, 37, may be pivotally connected on a vertical axis, as by the pin 38, for affording a universal connection in combination with the pivot 5. With this construction, the pontoon barge 3 may yield within limits in the direction of flow of the current, as well as it may rise and fall with the tide.

As a matter of practical safety, however, it is additionally advisable to connect guy lines to the pontoons 10, or to their brackets 8, and extend them diagonally to the shore at points both upstream and downstream from the launcher 2, and to anchor such guy lines at such points. Then the lines may be adjustably tensioned to correspond with the changes in current force and/or direction. Thus a control limit may be provided, over and above the pivotability of the connection member 4, against an excess tendency to bend the pipe in a substantially horizontal plane, due to forces, such as current effects.

Figs. 7–10 show details of construction, including structural features of the launcher 2, including its truss member 20, base 6, frames 21, and wheel units 22. In particular it may be seen how the truss member 20 can be fabricated out of conventional structural shapes, as T's 40, properly cross-braced longitudinally by the cross-brace members 39, and cross-braced transversely by the cross-brace members 41.

The central construction of the truss member 20 may comprise plates 42 extending vertically to box in the T's, and to provide holes 43 through which extend the pivot pins or studs 17 on which the truss member pivots. Such studs 17 interconnect, and are supported by, the upstanding plates 44 of the base 6.

Figure 12:
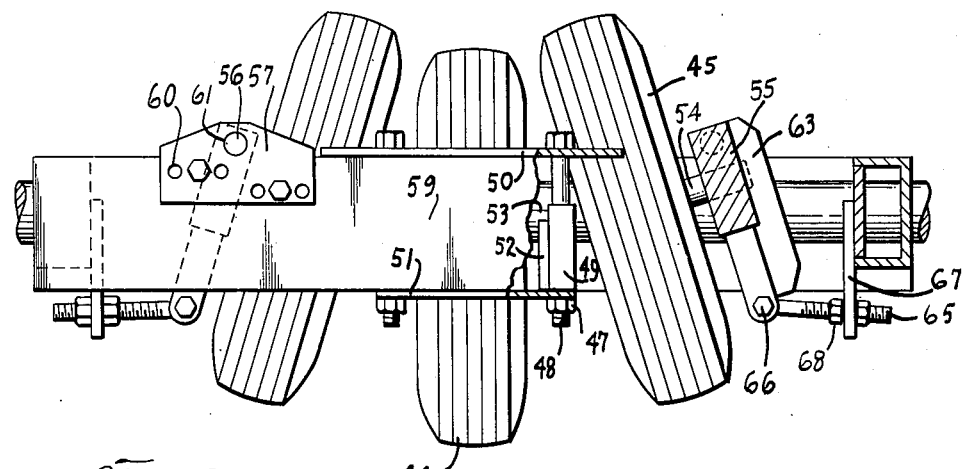
Fig. 12 is a sectional elevation taken along line 12—12 of Fig. 11.

As shown in Figs. 11 and 12, each wheel unit 22, 22', or 32, comprises two outer wheels 45, and a central wheel 46 therein between. In order to accommodate pipe of various diameters, it is necessary to adjust the wheels so that they combine to provide spaced apart surfaces which, in a substantially vertical plane, lie in a common arc of an imaginary circle coinciding with a transverse cross-section of the pipe to be supported as can be seen in Fig. 12.

The central wheel 46 need only be vertically adjustable, as by loosening the nuts 47, and turning the bolts 48 which are threaded into the adjustment bars 49. This changes the position of the bars 49 vertically with relation to the top plates 50, which are rigidly connected to the top of the frame 21, 21', or 30. Then, when the nuts 47 are again tightened up, the support plate 51 through which the bolts 48 extend, is also changed in vertical position with relation to the top plates 50. Then, as the supports 52, for the ends of the wheel axle 53, bear upon the support plate 51, vertical movement of such plate 51 results in vertical movement of the axle 53 of the central wheel 46.

Each outer wheel 45 has an axle 54 which extends into a longitudinally extending plate 55 terminating in end cylinders 56 which extend into holes 61 in brackets 57. Such brackets are bolted to transverse members 59 of the frame, having a plurality of bolt holes 60 therein so that the brackets 57 may be mounted to position the axis of the cylinders 56 at various vertical positions above the frame, and at various angles to the horizontal plane thereof. For finer adjustment the brackets 62 are mounted on the outer side of the plates 55. Such brackets comprise spaced apart plates 63, and the cylindrical head 64 of an adjustment bolt 65 may fit between such plates with the head ends to bear thereupon. The plates are drilled so that the bolt 66 may extend therethrough and through the cylindrical head 64. The outer end of the bolt 65 is threaded and extends through the bracket 67 which extends downwardly from the frame. The bolt 65 has a nut 68 on either side of the bracket 67.

In order to change the tilt of an outer wheel 45 it is only necessary to loosen the nuts 68 and move the bolt 65 to swing the longitudinally extending plate or wheel support 55 about the longitudinal axis of the end trunnion pins or cylinders 56 and then tighten the nuts again. Movement of the bolt 65 at a slight angle to the horizontal in order to accommodate the adjustments it affords, can be accomplished either by providing the cylinder head 64 of larger inner diameter than the outer diameter of the bolt 66, or by slotting the hole in the bracket 67 so that the major axis of the slot extends vertically.

The pontoon barge 3 includes the barge structure 11 which provides the pivot or cross-rod 19' on which is pivotally the frame 21'. As shown in Figs. 13–15, such structure has the brackets 8 connected thereto by the nuts and bolts, there being a plurality of vertically aligned holes in the brackets 8 so that they may be mounted at various vertical positions with relation to the barge structure 11. To complete the encirclement of a pontoon 10, a cable 9 is extended from the pivot 71 on the lower part of the bracket, around the pontoon, and through the lug 72 on the top portion of the bracket, the end 73 of the cable being threaded so that the nut 74 may be tightened against the lug.

As an additional feature, an extra pair of wheels 75 is provided, the axles 76 of such wheels being threadable into the support 77 which may be slidably adjustable, by means not shown, to positions upon the pivot 19'. This provides additional side support and bearing for the pipe line after it is water borne and subject to waves.

In extending a pipe line across a body of water it is found practicable to first excavate the trench 80 into which the pipe line 12 is to be finally sunk, and then the pipe line, weighted to sink to a calculated position just above such trench 80, is positioned in the water just above this trench. The buoyancy of the pipe, which has its outer end closed by the plug 81, is determined by the number and spacing of the float barrels 15 which may be connected thereto. In order to insure sinking to the desired depth such barrels 15 are substantially filled with water. However, it is not desirable to have the end 82 of the pipe line 12 slanted downwardly, since it might otherwise gouge into the formation floor 14' at the bottom of the trench. To insure against such an occurrence, the float barrel 15' on such end 82 has a substantially lesser amount of water therein than the float barrels 15 spaced therefrom.

In order to control the buoyancy provided by each float barrel, a cable 83 is connected to each barrel and extends to a buoy 84 which floats on the surface of the water 85. Also, a flexible air line 86 and water line 87, as hose, are connected to the float barrel and these lines are longer than the cable 83 and extend therealong up to the buoy 84. Suitable valves 88 and gages 89 may be provided for these lines within the hood 90 of the buoy 84 and the air pressure may be increased and the water ejected, or else the water may be increased, as desired. In order that the positions of the buoys 84 may be known, a suitable sounding device, as the bell ringing system 91, may be provided within the hood 90, and also a visual indicating means may be provided as the light 92 which is actuated by the battery 93.

Throughout this specification wheel units have been described but it is pointed out that such invention is not thus limited and that other guide means may be employed as well. Wheels of resilient material are suggested where the object to be launched has a surface to be protected, as, for instance, process coated and wrapped pipe. On the other hand the invention claims, and will work equally as well with any type of guide means, as steel rollers, sleeves, et cetera, as in the case where it is not necessary to especially protect the surface of the object handled, as for instance, when concrete coated pipe is the object launched.

By employing this method of extending a pipe line, such may be taken across rivers having heavy traffic therealong without interfering with such traffic, caution only being necessary to avoid vessel contact with the buoys 84.

Broadly this invention considers structures and method for extending an object, as a long tubular structure or pipe line, across a body of water when it is desired to entrench such object into the formation floor below such body; the structures and methods provided being designed to permit the water-borne support of the pipe line adjacent the shore to rise and fall with the tide without risking bending the pipe, the support also being adapted to yield, within limits, to the direction of current without risk of such bending.

What is claimed is:

1. Launching apparatus for guiding an object between positions in and out of a body of water including a series of object cradling guides spaced from one another in the longitudinal direction of object launching, a series of rocking frames, each having a pivot mounting intermediate its opposite ends and mounting a pair of said guides, one on each side of said pivot mounting, a buoyant support pivotally mounting one of said rocking frames and being located in the body of water to rise and fall with changes in level of the body of water to maintain the pivot axis of the frame mounting on said buoyant support at constant relation with the water surface level, a swinging truss member, means pivotally mounting said truss member a pair of said swinging frames one on each side of the swinging axis of said truss member, a base pivotally supporting said swinging truss member at a point intermediate the pivot mountings thereon of said pair of rocking frames and a tie connection having its opposite ends pivotally joined respectively with said base and said buoyant support holding them against misalignment of their respective cradle guides in the direction of launching while accommodating changes in relative level of the base and said buoyant support.

2. A system for launching a pipe line into a body of water, including a series of pipe supporting wheels arranged in sets engageable with the pipe underside on both sides of the pipe longitudinal axis and the sets being spaced apart in the longitudinal direction of pipe travel thereon, a series of rocking beams extending in longitudinal alignment along the longitudinal direction of pipe launching travel and being longitudinally spaced from one another and each rocking beam rotatably supporting at longitudinally spaced locations thereon a pair of said longitudinally spaced sets of wheels each on an axis transverse to the longitudinal direction of pipe travel, means pivotally mounting each rocking beam on a transverse axis longitudinally intermediate the pair of longitudinally spaced sets of wheels rotatably supported thereon, ground based supports for all said pivot mounting means except the pivot mounting means for the endmost of said longitudinally aligned rocking beams, a water borne float carrying the last mentioned pivot mounting means, the ground based support of the pivot mounting means for a pair of rocking beams next adjacent that pivot mounting means which is carried by the water borne float comprising a longitudinally extending walking beam carrying at its opposite ends said pivot mounting means for said pair of rocking beams last mentioned and a transverse pivot connection on which said walking beam is fulcrumed intermediate its opposite ends.

3. The structure of claim 2 wherein a tie connection locates the water borne float in longitudinal alignment with the next adjacent ground based support and is trunnioned at opposite ends to the float and said next adjacent ground based support.

4. In a launcher of the character described, a base support, a walking beam, a trunnion connection joining said walking beam intermediate its opposite ends to said base support on a pivotal axis transverse to the direction of launching travel, a pair of rocking beams in longitudinal alignment with each other and longitudinally spaced apart in the direction of launching travel and on opposite sides of said walking beam trunnion connection, means carried by said walking beam on opposite sides of its trunnion connection and pivotally mounting said rocking beams for swinging freedom about axes generally parallel to the axis of said trunnion connection, a series of cooperating bearing elements spaced apart longitudinally of the direction of launching travel for engagement in aligned relation with an object to be launched, and bearing element locating and supporting means carried by each rocking beam and longitudinally spaced with and on both sides of its pivot mounting on the walking beam and mounting said spaced bearing elements in cooperative relation with one another.

5. The structure of claim 4 wherein each bearing element is a wheel and its supporting means mounts it for rotation about an axis in parallelism with the axes of said trunnion connection and said pivot mounting means of the rocking beams.

6. In a wheel support for the relative travel thereon of an object having a bearing surface which is transversely arcuate in relation to the direction of said relative travel, a supporting frame, a series of wheels for roll engagement by the arcuate bearing surface of an object, means on the frame rotatably mounting a pair of said wheels in transversely spaced and upwardly divergent inclined relation on axes which converge upwardly and outwardly relative to one another, other means on the frame rotatably mounting another of said wheels about a horizontal transverse axis positioned at a height to locate the uppermost tread surface of the wheel in a region between and just below the uppermost bearing tread surfaces of said pair of inclined wheels, the mounting means for said pair of wheels including an axle for each wheel and an axle hinged support whose axis extends longitudinally of the direction of said relative travel for a swinging adjustment of the axle in setting the inclined plane of the wheel and an adjustable tie connection between said frame and the support for fixing the latter in set position.

7. In a wheel support for the relative travel thereon of an object having a bearing surface which is transversely arcuate in relation to the direction of said relative travel, a supporting frame, a series of wheels for roll engagement by the arcuate bearing surface of an object, means on the frame rotatably mounting a pair of said wheels in transversely spaced and upwardly divergent inclined relation on axes which converge upwardly and outwardly relative to one another, other means on the frame rotatably mounting another of said wheels about a horizontal transverse axis positioned at a height to locate the uppermost tread surface of the wheel in a region between and just below the uppermost bearing tread surfaces of said pair of inclined wheels, the mounting means for said pair of wheels being adjustably trunnioned on the frame and swingable relative to one another toward and from one another about individual axes extending longitudinally of the direction of said relative travel and having fastenings by which the axles are fixed in selected positions of adjustment.

References Cited in the file of this patent

UNITED STATES PATENTS

| | | |
|---|---|---|
| 328,793 | Leonhardt | Oct. 20, 1885 |
| 707,951 | Alexander | Aug. 26, 1902 |
| 1,325,167 | Olson | Dec. 16, 1919 |
| 1,441,698 | Meem | Jan. 9, 1923 |
| 2,035,927 | Smith | Mar. 31, 1936 |
| 2,174,193 | Mickelson et al. | Sept. 26, 1939 |
| 2,215,460 | Childress | Sept. 24, 1940 |
| 2,381,789 | Turnbull | Aug. 7, 1945 |
| 2,424,692 | Harshberger | July 29, 1947 |
| 2,607,937 | Stone | Aug. 26, 1952 |
| 2,659,211 | Notarbartolo | Nov. 17, 1953 |
| 2,692,101 | Doolittle et al. | Oct. 19, 1954 |

FOREIGN PATENTS

| | | |
|---|---|---|
| 669,532 | Germany | Dec. 29, 1938 |